United States Patent
Beaurepaire

(10) Patent No.: US 9,984,076 B2
(45) Date of Patent: May 29, 2018

(54) METHOD AND APPARATUS FOR DETERMINING STATUS UPDATES ASSOCIATED WITH ELEMENTS IN A MEDIA ITEM

(71) Applicant: HERE Global B.V., Veldhoven (NL)

(72) Inventor: Jerome Beaurepaire, Berlin (DE)

(73) Assignee: HERE Global B.V., Veldhoven (NL)

( * ) Notice: Subject to any disclaimer, the term of this patent is extended or adjusted under 35 U.S.C. 154(b) by 320 days.

(21) Appl. No.: 14/040,170

(22) Filed: Sep. 27, 2013

(65) Prior Publication Data

US 2015/0095310 A1    Apr. 2, 2015

(51) Int. Cl.
G06F 7/00       (2006.01)
G06F 17/30      (2006.01)
G06F 3/0484     (2013.01)

(52) U.S. Cl.
CPC ........ G06F 17/3005 (2013.01); G06F 3/0484 (2013.01); G06F 17/30038 (2013.01)

(58) Field of Classification Search
CPC ............... G06F 17/3005; G06F 3/0484; G06F 17/30038
USPC ........................................... 707/722
See application file for complete search history.

(56) References Cited

U.S. PATENT DOCUMENTS

| | | |
|---|---|---|
| 6,184,858 B1 | 2/2001 | Christian et al. |
| 6,401,029 B1 * | 6/2002 | Kubota .............. G01C 21/3611 701/408 |
| 8,726,142 B2 * | 5/2014 | Piantino ................ G06Q 50/01 707/728 |
| 8,832,560 B2 * | 9/2014 | Yung ..................... G06Q 50/01 715/738 |
| 8,869,017 B2 * | 10/2014 | Piantino ................ G06Q 50/01 715/201 |
| 8,887,035 B2 * | 11/2014 | McDonald ............. G06Q 10/00 715/201 |
| 2006/0115108 A1 | 6/2006 | Rodriguez et al. |
| 2009/0132264 A1 | 5/2009 | Wood et al. |
| 2009/0282336 A1 | 11/2009 | Lindley et al. |
| 2009/0300525 A1 * | 12/2009 | Jolliff ................ H04M 1/72544 715/764 |
| 2010/0304804 A1 * | 12/2010 | Spivack ................ G06N 3/006 463/2 |

(Continued)

FOREIGN PATENT DOCUMENTS

CN       102334106 A    1/2012
JP        5250049 B2    7/2013

(Continued)

*Primary Examiner* — Kris Mackes
*Assistant Examiner* — Lin Lin Htay
(74) *Attorney, Agent, or Firm* — Ditthavong & Steiner, P.C.

(57) ABSTRACT

An approach is provided for a more efficient and user friendly mechanism for determining and presenting status updates associated with elements in a media item. The approach includes a method for processing and/or facilitating a processing of one or more media items to determine one or more elements present in the one or more media items. The method further includes determining a current status information associated with the one or more elements. The method also includes causing, at least in part, a presentation of one or more representations of the current status information.

18 Claims, 13 Drawing Sheets

(56) References Cited

U.S. PATENT DOCUMENTS

| | | | |
|---|---|---|---|
| 2011/0044512 A1* | 2/2011 | Bambha | G06F 17/30256 382/118 |
| 2011/0145305 A1 | 6/2011 | Kamei et al. | |
| 2012/0123830 A1* | 5/2012 | Svendsen | G06Q 30/0252 705/14.5 |
| 2012/0310968 A1* | 12/2012 | Tseng | G06F 17/30247 707/769 |
| 2012/0323909 A1* | 12/2012 | Behforooz | G06F 17/3053 707/728 |
| 2013/0073971 A1* | 3/2013 | Huang | G06Q 50/01 715/738 |
| 2013/0159132 A1* | 6/2013 | Adams | G06Q 50/01 705/26.7 |
| 2013/0201344 A1* | 8/2013 | Sweet, III | G06K 9/00261 348/169 |
| 2013/0212479 A1* | 8/2013 | Willis | G06Q 10/10 715/736 |
| 2014/0046976 A1* | 2/2014 | Zhang | G06F 17/30483 707/772 |
| 2014/0379796 A1* | 12/2014 | Altaf | G06Q 50/01 709/204 |

FOREIGN PATENT DOCUMENTS

| | | |
|---|---|---|
| RU | 2246697 C1 | 2/2005 |
| WO | 2009067159 A3 | 5/2009 |
| WO | 2010073629 A1 | 7/2010 |
| WO | 2010114875 A1 | 10/2010 |

* cited by examiner

METHOD AND APPARATUS FOR DETERMINING STATUS UPDATES ASSOCIATED WITH ELEMENTS IN A MEDIA ITEM

BACKGROUND

Service providers (e.g., wireless, cellular, etc.) and device manufacturers are continually challenged to deliver value and convenience to consumers by, for example, providing compelling network services. One area of rapid development has been in devices, services, and applications related to creating, accessing, and consuming various contents (e.g., music, video, pictures, electronic books, files, documents, etc.) by users anywhere and anytime. For example, a user at an event may use a user device (e.g., a camera, a mobile phone, etc.) to capture images or video recordings of people, objects, points of interest (POIs), or the like, which he may store for future access or sharing with other users. However, as users may continuously add to their collection of media contents (e.g., images, videos, audio recordings, etc.), it may be challenging to track updates or status changes to the people, objects, or POIs in a given media item. For example, a user may have a picture of a group of classmates from when he was in college and after a few years, it would be interesting but difficult to determine the status of the classmates in the picture. In another example, a user may have a picture of a resort town (e.g., including buildings, beach, streets, etc.) taken many years ago during a vacation and now the user may wish to see if there have been any changes to the objects, building, scenic routes, etc. in the picture. Therefore, service providers and device manufactures face significant technical challenges in enabling users to determine status updates on elements in media items without significant user efforts.

SOME EXAMPLE EMBODIMENTS

Therefore, there is a need for an efficient and user friendly mechanism to determine and present status updates associated with elements in a media item.

According to one embodiment, a method comprises processing and/or facilitating a processing of one or more media items to determine one or more elements present in the one or more media items. The method further comprises determining a current status information associated with the one or more elements. The method also comprises causing, at least in part, a presentation of one or more representations of the current status information.

According to another embodiment, an apparatus comprises at least one processor, and at least one memory including computer program code, the at least one memory and the computer program code configured to, with the at least one processor, cause, at least in part, the apparatus to process and/or facilitate a processing of one or more media items to determine one or more elements present in the one or more media items. The apparatus is also caused to determine a current status information associated with the one or more elements. The apparatus is further caused to cause, at least in part, a presentation of one or more representations of the current status information.

According to another embodiment, a computer-readable storage medium carries one or more sequences of one or more instructions which, when executed by one or more processors, cause, at least in part, an apparatus to process and/or facilitate a processing of one or more media items to determine one or more elements present in the one or more media items. The apparatus is also caused to determine a current status information associated with the one or more elements. The apparatus is further caused to cause, at least in part, a presentation of one or more representations of the current status information.

According to another embodiment, an apparatus comprises means for processing and/or facilitating a processing of one or more media items to determine one or more elements present in the one or more media items. The apparatus further comprises means for determining a current status information associated with the one or more elements. The apparatus also comprises means for causing, at least in part, a presentation of one or more representations of the current status information.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface (UI) element and/or (2) at least one device UI functionality, the (1) at least one device UI element and/or (2) at least one device UI functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device UI element and/or (2) at least one device UI functionality, the (1) at least one device UI element and/or (2) at least one device UI functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the originally filed method claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for determining and presenting status updates associated with one or more elements in a media item are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
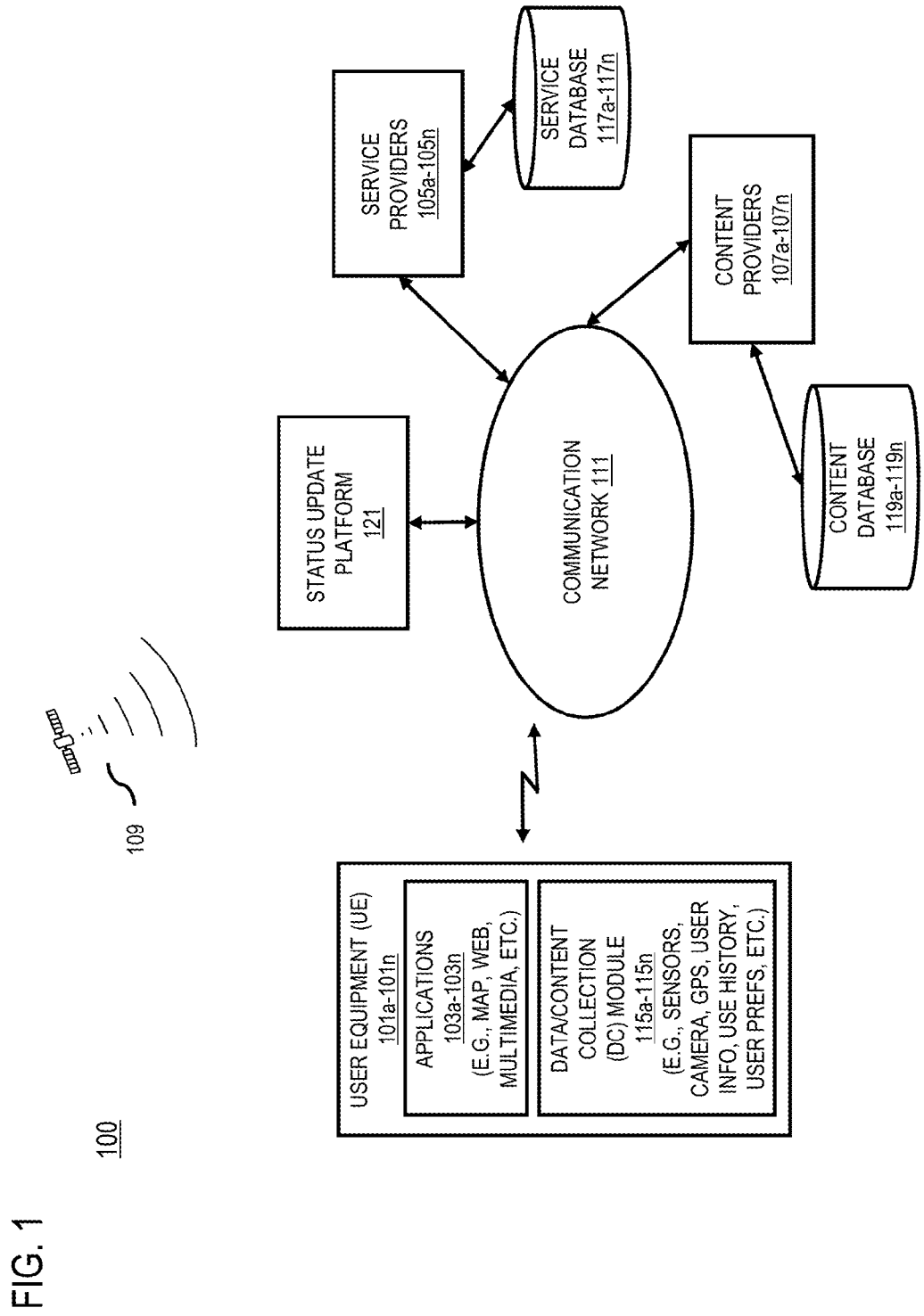
FIG. 1 is a diagram of a system capable of determining and presenting status updates associated with elements in a media item, according to an embodiment.

FIG. 1 is a diagram of a system capable of determining and presenting status updates associated with one or more elements in a media item, according to an embodiment. With the proliferation of user devices capable of capturing, generating, and accessing various media content (e.g., pictures, videos, audio recordings, etc.) anytime and anywhere, many users generate and accumulate large volumes of media items. For instance, a user can use a camera on a mobile device to capture a variety of pictures at home, at private events, at public events, including family members, friends, colleagues, classmates, and the like. Similarly, the pictures may include various objects or POIs, which may be in the background or may have been the actual target/focal-point in the picture. For example, the picture may include a scene from a certain city's skyline depicting several buildings and structures. However, over time, the actual objects, people or POIs captured in the pictures may go through various physical changes (e.g., people get older, buildings are torn down and new buildings are erected, etc.) Additionally, relevant information/status associated with the objects, people or POIs in the pictures may also change. For instance, some of the people in the pictures may have moved to a different city/state, may have gotten married, may have had children, may have changed jobs, may be in new relationships, or the like. As a result, unless a user is physically close to a POI or is in regular contact with people depicted in the user's pictures, then the user may not be able to easily track and determine status changes associated with those POIs, objects, people, or the like. Alternatively, the user may search through various sources to determine any possible status changes. However, such searches may become time consuming and resource intensive as the collection of a user's media content may grow over time as well as the possibility that the user may not be able to effectively search through all possible private or public database sources. Therefore, there is a need for a method to determine and present status updates associated with one or more elements in various media items.

To address, at least these problems, a system 100 of FIG. 1 introduces the capability of determining and presenting status updates associated with one or more elements in a media item. Typically, a user may have a collection of media items, e.g., pictures, videos, audio recordings, etc., which may be in a digital format and stored at a local user device or at a remote storage. Also, the media items may be in traditional analog, film, or paper format that may be digitized by various available processes for storage, consumption, editing, sharing, or the like. In some instances, a media item may include metadata or may be tagged with various information associated with the media item or with one or more elements in the media item, wherein the information may be provided by a user and/or may be determined by the device used to create/capture/edit/consume the media item. For example, a camera used to capture an image may determine and include with an image file information indicative of the general or exact location, date, time, event, etc. when the media item was created. Additionally, the user may tag various elements in the media item with other information that may be of interest/important to the user. For instance, the tag information may be associated with a building depicted in an image of a city that the user visited in the past. Similarly, the media item may include various objects, people, POIs, and the like.

In one scenario, a user may wish to know what is the current status on various elements present in an image; for example, a picture may be of several friends at a wedding party from a few years ago, and now the user would like to know of any status updates on those friends. In various embodiments, the system 100 may process a media item to determine one or more elements present therein (e.g., in a picture, video or audio recordings, etc.) and conduct a search through various databases to determine current status information associated with those elements. In various scenarios, the status update may be associated with physical or relationship characteristics of the elements in a media item. For example, the status update may present current information about a building that is present in a picture, or about the relationship of people depicted in a picture, etc. In various embodiments, the status update may be presented based on the type of information requested and/or the type of information available. For example, the information may be presented as text, images, video, audio, graphics, and the like.

In one example, a media item depicting people may be tagged with one or more social networking information items where the status update information may search for and present any changes in the relationship of those people depicted in the media item. In one example, if two of the individuals depicted in the picture are no longer in a relationship, then the picture may include a visual effect to indicate that change, for example, a break-line between the two individuals, a fade-out of one or both depictions in the images, etc.

In one embodiment, the system 100 processes and/or facilitates a processing of one or more media items to determine one or more elements present in the one or more media items. In various embodiments, one or more applications or algorithms may perform one or more image processing, video processing, audio processing, or the like procedures on the one or more media items for determining the one or more elements. For example, an image processing of a picture may detect people, building, POIs, objects, etc. depicted in the picture. In one embodiment, an element detected in a media item may be compared to other elements of similar/same type in one or more databases in order to ascertain as to what that element is. For example, an element detected in a picture may be of a person, a car, a building, a dog, or other objects, which may be compared to elements in databases containing similar type elements. In one embodiment, a facial recognition algorithm, application, or software may be utilized to process an element including a depiction of a person so that it can be determined who that person is or was. For example, facial recognition data of a person may be compared to the same type of data in one or more databases/sources (e.g., public, private, government, paid, free, social networking sites, etc.) in order to identify that person. In one example, an image of a building may be compared with information in one or more databases in order to determine where and what that building is or was.

In one embodiment, the system 100 determines a current status information associated with the one or more elements. In one embodiment, identification information associated with an element may be utilized to conduct one or more searches in one or more databases for determining current status information associated with that element. In various embodiments, the current status information includes geographical information, physical characteristics, personal relationship information, or a combination thereof. In one example, a current status information associated with a building may indicate that the building no longer exists and now there is a new building in its place. In another example, the current status information may indicate that the exterior of the building has been remodeled. In one example, a current status information associated with a person may indicate various changes in the person's physical characteristics, personal relationships, geographical location, employment, education, etc. In various examples, the current status information for various elements in a media item may be determined from various databases (e.g., public, private, government, paid, free, etc.) where the information may be from a marriage license, a birth certificate, a death certificate, a sale of a property, school records, or the like.

In one embodiment, the system 100 causes, at least in part, a presentation of one or more representations of the current status information. In various embodiments, the current status information may be presented as a graphical representation, textual information, audio, or the like. In various examples, the current status information may be presented along with the original media item so that a user may see the potential status changes. In one example, the current status information may include relational links among a plurality of people depicted in a media item.

In one embodiment, the system 100 determines the one or more elements based, at least in part, on tagging information associated with the one or more media items. In one scenario, at the time when a media item was created, a user may have tagged one or more elements in the media item with information that may have been important or of interest to the user. For example, a user may have tagged a building in a picture of a college campus, which the user attended, with information indicating that his first and/or his final college classes were in that building. In one example, a user may have an old picture that depicts an old factory building where his grandfather had his first job at, and the user may digitize that picture and tag it with that information. In one embodiment, the tagging of the information may be done by a device utilized to create a media item. In various cases, the tagging information may include exact or approximate information, which may be utilized to determine one or more elements in a media item. For example, the tagging information of an element in a media item may include a name of a person, location information, relevance to other elements in the media item (e.g., siblings, parents, friends, my parents' house, my son's first bicycle, etc.) or the like.

In one embodiment, the system 100 determines metadata associated with the one or more media items. In various examples, the metadata may have been added by a device used to create the media item and/or by a user, where the metadata may indicate how the media item was created, purpose of the media item, time and date of creation, elements in the media item, creator of the media item, location where the media item was created, media item data type, size of a digital media item file, image/audio quality parameters of the media item, or the like. In one embodiment, the determination of the current status information is further based, at least in part, on the metadata. For example, the location information may indicate a potential location of an element, e.g., a building, a person, a car, or the like, that may be present in the media item, wherein that location information may be used to search for a current status information associated with that element. In one example, the metadata may indicate information of an event where the media item was created at, wherein that event information may be used to search for a current status information on the elements present in that media item. In one embodiment, the metadata include, at least in part, contextual information associated with a capture of the one or more media items. In one example, the contextual information may be indicative of a relevance of a media item to a user, and may further help to identify people, POI, objects or the like. Further, the contextual information may provide detailed information about the elements identified in the media item, e.g., birth dates, wedding dates, event location, geographical location, themes, dates, etc.

In one embodiment, the system 100 determines one or more other media items that depict (a) at least one of the one or more elements, (b) a scene depicted in the one or more media items, or (c) a combination thereof, wherein the one or more other media items are captured in a more current time period than the one or more media items. In one embodiment, the one or more other media items may be found in one or more public, private, government, or the like databases. For example, the system 100 may have determined that there is a person depicted in an first picture, and it may use that depiction (e.g., image recognition data) to search through the one or more databases in order to find another picture that would include a similar/matching depiction of a person. In one example, the first picture may include a depiction of a scene including various elements, e.g., buildings, POIs, objects, etc., where the image recognition data for the one or more elements may be used to search through the one or more databases for media items that may include at least one of the one or more elements. In one embodiment, a particular element in a media item may be tagged for conducting the search for the one or more other media items.

In one embodiment, the system 100 determines the current status information based, at least in part, on a comparison of the one or more other media items against the one or more media items. In one scenario, the current status information may be based on a comparison of an element depicted in a media item to a similar/same element depicted in the other media item. For example, the image of a person, object, building, POI, etc. present in a first media item may be compared to an image of a person, object, building, POI, etc. present in another media item, wherein the elements compared may potentially be the same person, object, building, POI, etc. In one embodiment, the current status information may be based on a comparison of physical characteristics associated with an element in a media item compared to physical characteristics associated with a similar/same element in another media item. For example, the facial features of a person depicted in a first picture may be compared to facial features of the same person depicted in another picture, which may indicate some changes to the facial features (e.g., different hair color/style). In one embodiment, the current status information may be based on information associated with an element present in one or more other media items. For example, a comparison of a first and second pictures indicates that a person depicted in the first picture is the same or most likely the same person depicted in the second picture. In one embodiment, the current status information and the one or more other media items are determined from one or more public sources, one or more private sources, or a combination thereof. In one scenario, the image information of the person depicted in the second picture may be used to conduct a search via one or more data sources, e.g., a social networking site, to determine the current status information associated with the person depicted in the second picture who is the same or most likely the same person depicted in the first picture. In various scenarios, the same approach may apply to other types of elements present in various types of media items. For example, the elements may include buildings, POIs, objects, cars, animals, other structures, or the like, wherein the media items may include an image, a video or audio recording, and the like.

In one embodiment, the presentation of the current status information includes one or more visual effects associated with the one or more elements present in the one or more media items, the one or more other media items, or a combination thereof. In one embodiment, the presentation of a current status information may include one or more visual effects, which may be caused by one or more applications, software, algorithms, or the like. In one scenario, updates to an element in a media item may be shown by highlighting, fading out, etc. the element based on the updates. For example, if the update status information on a building in a media item indicates that that building is no longer there, then the image of that building in the media item may be faded out and provide a visual indicator to the user. In one example, changes to physical characteristics of a person present in a media item may be highlighted in order to show changes to the facial features, hair, height, or the like.

In one embodiment, the system 100 determines a time range based, at least in part, on the metadata associated with the one or more media items, metadata associated with the one or more other media items, a user input, or a combination thereof. In one use case scenario, a service provider may determine a time interval between a first media item and a second media item from the metadata associated with the first and the second media items. For example, the first media item may be a picture that was taken several years ago and the second media item may be another picture that was taken several months ago. In one embodiment, a user may indicate the time range of interest for determining and presenting any available current status information. For example, a service provider may have determined a plurality of status updates associated with a certain POI during a five-year period; however, the user may be interested in the status updates available only for the past two years. In various embodiments, the time range may be associated with a user, a user device, type of media items, type of elements in a media item, tagging information, metadata information, or the like.

In one embodiment, the system 100 causes, at least in part, the presentation of the one or more representations of the current status information based, at least in part, on the time range. In one embodiment, the update status information may be presented as a plurality of updates which may have been determined for that time interval. For example, the first picture created five years ago includes a depiction of a certain person and a second picture created six months ago includes a depiction of that same person, wherein the update status information may be presented along a timeline from five years ago to the time of the second picture, six months ago. In various scenarios, the plurality of media items during that time range may be determined from various sources, for example, public records, school graduations, wedding registries, or the like, wherein the plurality of media items may allow a user to see the changes/transformations that are associated with an element in a media item over a certain time period.

In one embodiment, the system 100 causes, at least in part, a presentation of a user interface including the one or more media items, the one or more other media items, or a combination thereof. In one embodiment, a user interface including a first media item and/or a second media item may be presented at a user device, wherein the first and/or second media items may be available from the user device, a local storage, a remote storage, or the like. In one example, a user may select the first and/or the second media item. In various embodiments, the UI may be presented by one or more applications at the user device, by a service provider, or the like.

In one embodiment, the system 100 determines one or more user interactions with the one or more media items, the one or more other media items, or a combination thereof. In one embodiment, a user may choose to interact with a media item where one or more elements may be present. In one use case scenario, the user may select, highlight, hover over, one or more elements in a media item. For example, the UI may provide one or more options for the user to select one or more elements in a media item via one or more UI options, e.g., highlight, click, hover over, or the like. In one example, a user may select a specific element in a first media item that the user may wish to determine a current status information for. In one example, the user may select a specific element in a first media item and a specific element in a second media item for determining the current status information associated with those elements.

In one embodiment, the system 100 causes, at least in part, the comparison based, at least in part, on the one or more user interactions. In one example, a service provider may cause the comparison of one or more elements in a first media item with one or more elements in a second media item. In one embodiment, a presentation of one or more representations of a current status information is based, at least in part, on the one or more user interactions. For example, the user interactions may indicate that the user wishes for a presentation of a current status information for only a certain element present in a media item. In one example, a service provider may determine the presentation of the one or more representations of a current status information based on the user interaction and an availability of the current status information associated with the one or more elements in a media item.

In various embodiments, one or more users may utilize capabilities and benefits of the system 100 to easily obtain status updates associated with one or more elements in various media items, for example, in images, video, audio, and the like, wherein the process is simple, efficient, and user-friendly without cumbersome searches by the user. Further, the status updates may be represented via graphical or textual formats in intuitive UIs so that a user may see or hear how the elements may have changed since the media item was captured.

As shown in FIG. 1, in one embodiment, the system 100 includes user equipment (UE) 101a-101n (also collectively referred to as UE 101 and/or UEs 101), which may be utilized to execute one or more applications 103a-103n (also collectively referred to as applications 103) including social networking, web browser, content sharing, multimedia applications, augmented reality (AR), virtual reality (VR), UI, map application, web client, etc. In various embodiments, the applications 103 may be utilized to scan, capture, process, submit, analyze, append, tag, etc. various media items or elements in the media items. For example, an application 103 on a UE 101 may be used to review a digital image and any related information. In various scenarios, the application 103 may facilitate creation and/or consumption of various contents, e.g., viewing images/videos, listening to audio recordings, reading documents, and the like. Additionally, the applications 103 may render and/or facilitate a rendering a presentation of media items including AR and/or VR elements. For example, current graphical information of a POI may be superimposed on a media item containing an earlier depiction of that POI.

Additionally, the applications 103 may facilitate communication with other UEs 101, one or more service providers 105a-105n (also collectively referred to as service providers 105), one or more content providers 107a-107n (also collectively referred to as content providers 107), one or more GPS satellites 109a-109n (also collectively referred to as GPS satellites 109), a status update platform 121 (see discussion in FIG. 3), and/or with other components of the system 100 directly and/or via communication network 111. In one embodiment, the UEs 101 may include data/content collection modules 115a-115n (also collectively referred to as DC module 115) for determining and/or collecting data and/or content associated with the UEs 101, one or more users of the UEs 101, applications 103, one or more content items (e.g., multimedia content), and the like. In addition, the UEs 101 can execute an application 103 that is a software client for storing, processing, and/or forwarding one or more information items to other components of the system 100.

In various scenarios, the applications 103 and/or the DC module 115 may facilitate tagging of various elements present in a media item and/or may facilitate creating or associating metadata with the media item.

In one embodiment, the service providers 105 may include and/or have access to one or more service databases 117a-117n (also collectively referred to as service database 117), which may include various user information, user profiles, user preferences, one or more profiles of one or more user devices (e.g., device configuration, sensors information, etc.), service providers 105 information, other service providers' information, and the like. In one embodiment, the service providers 105 may include one or more service providers offering one or more services, for example, online shopping, social networking services (e.g., blogging), content sharing, media upload, media download, media streaming, account management services, or a combination thereof. Further, the service providers 105 may conduct a search for content items, media items, information, coupons, and the like associated with one or more users, POIs, geo-locations, and the like. In one embodiment, a service provider 105 may receive and process a request/input from a user for determining status information associated with one or more elements present in one or more media items. In one embodiment, the service provider 105 may utilize various algorithms, software applications, modules, hardware, firmware, and the like for processing, recognizing, detecting, comparing, and the like, content items (e.g., media items) that may be associated with a user, a user device, or the like.

In one embodiment, the content providers 107 may include and/or have access to one or more content database 119a-119n (also collectively referred to as content database 119), which may store, include, and/or have access to various content items. For example, the content providers 107 may store content items (e.g., at the content database 119) provided by various users, various service providers, crowd-sourced content, and the like. Further, the service providers 105 and/or the content providers 107 may utilize one or more service application programming interfaces (APIs)/integrated interface, through which communication, media, content, and information (e.g., associated with users, applications, services, content, etc.) may be shared, accessed and/or processed.

In various embodiments, the service providers 105 and/or the content providers 107 may include and/or have access to information associated with people, POIs, objects, etc. For example, the information may be available from various public, private, or government controlled databases, which may be accessed via the communication network 111.

The UEs 101 may be any type of mobile terminal, fixed terminal, or portable terminal including a mobile handset, station, unit, device, healthcare diagnostic and testing devices, product testing devices, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, loud speakers, display monitors, radio broadcast receiver, electronic book device, game device, wrist watch, or any combination thereof, including the accessories and peripherals of these devices, or any combination thereof. It is also contemplated that the UEs can support any type of interface to the user (such as "wearable" circuitry, etc.) Further, the UEs 101 may include various sensors for collecting data associated with a user, a user's environment, and/or with a UE 101, for example, the sensors may determine and/or capture audio, video, images, atmospheric conditions, device location, user mood, ambient lighting, user physiological information, device movement speed and direction, and the like.

In one embodiment, the UE 101 includes a location module/sensor that can determine the UE 101 location (e.g., a user's location). The UE 101 location may be determined by a triangulation system such as a GPS, assisted GPS (A-GPS), Cell of Origin, wireless local area network triangulation, or other location extrapolation technologies. Standard GPS and A-GPS systems can use the one or more satellites 109 to pinpoint the location (e.g., longitude, latitude, and altitude) of the UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module/sensor may also utilize multiple technologies to detect the location of the UE 101. GPS coordinates can provide finer detail as to the location of the UE 101. In another embodiment, the UE 101 may utilize a local area network (e.g., LAN, WLAN) connection to determine the UE 101 location information, for example, from an Internet source (e.g., a service provider).

By way of example, the communication network 111 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the UEs 101, the service providers 105, the content providers 107, and the status update platform 121 may communicate with each other and other components of the communication network 111 using well known, new or still developing protocols. In this context, a protocol includes a set of rules defining how the network nodes within the communication network 111 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the UEs 101, the service providers 105, and the status update platform 121 may interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others. It is also noted that the role of a client and a server is not fixed; in some situations a device may act both as a client and a server, which may be done simultaneously and/or the device may alternate between these roles.

Figure 2:
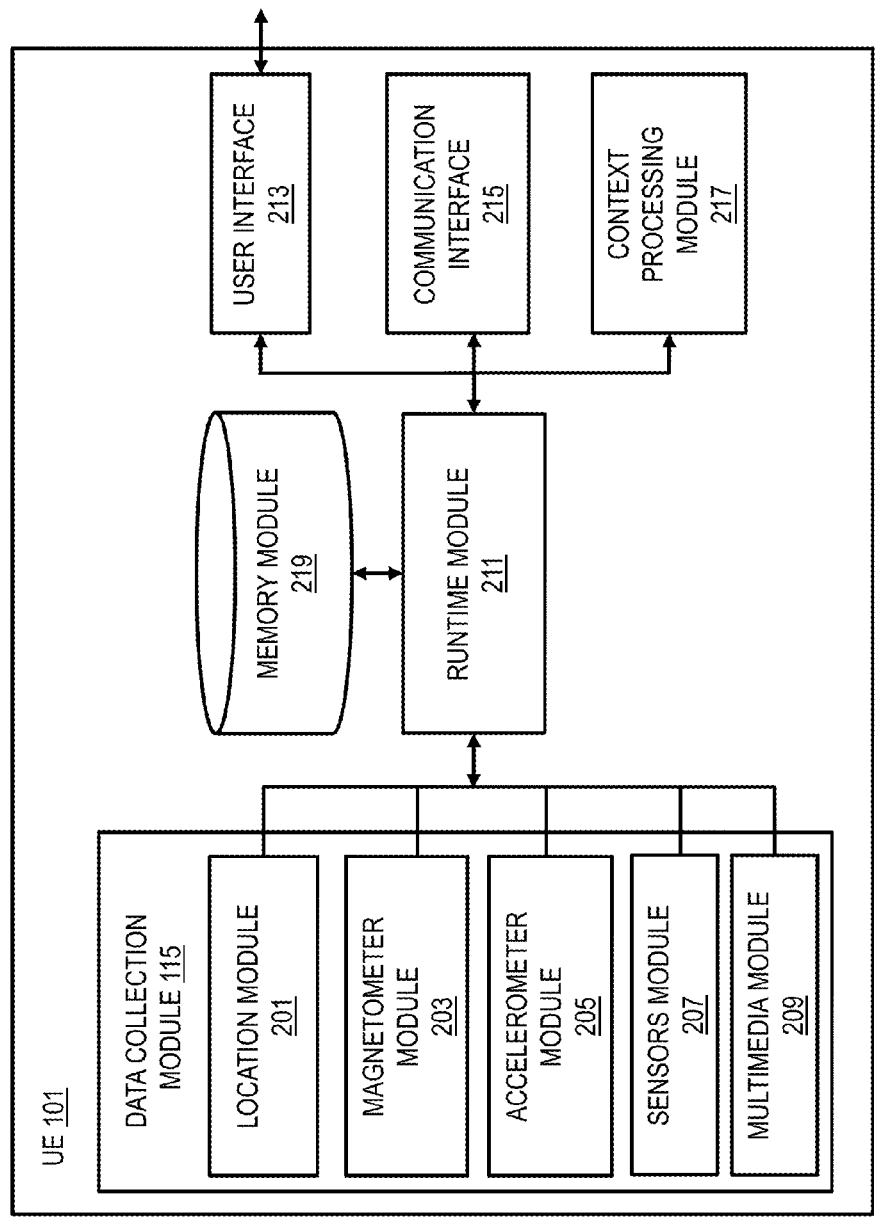
FIG. 2 is a diagram of components of a user equipment capable of content creation or consumption, according to an embodiment.

FIG. 2 is a diagram of the components of a user equipment capable of content creation or consumption, according to an embodiment. By way of example, a UE 101 includes one or more components for receiving, generating, capturing, and/or scanning of various media items including images, video or audio recordings. It is contemplated that the functions of these components may be combined in one or more components or performed by other components of equivalent functionality. In this embodiment, the UE 101 includes a DC module 115 that may include one or more location modules 201, magnetometer modules 203, accelerometer modules 205, sensors module 207, and multimedia module 209. Further, the UE 101 may also include a runtime module 211 to coordinate the use of other components of the UE 101, a user interface 213, a communication interface 215, a context processing module 217, and a memory module 219. The applications 103 of the UE 101 can execute on the runtime module 211 utilizing the components of the UE 101.

The location module 201 can determine a user's location, for example, via location of a UE 101. The user's location can be determined by a triangulation system such as GPS, assisted GPS (A-GPS), Cell of Origin, or other location extrapolation technologies. Standard GPS and A-GPS systems can use satellites 109 to pinpoint the location of a UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 201 may also utilize multiple technologies to detect the location of the UE 101. Location coordinates (e.g., GPS coordinates) can give finer detail as to the location of the UE 101 when media is captured. In one embodiment, GPS coordinates are stored as context information in the memory module 219 and are available to the context processing module 217, the DC module 115, the service providers 105, and/or to other entities of the system 100 (e.g., via the communication interface 215). Moreover, in certain embodiments, the GPS coordinates can include an altitude to provide a height. In other embodiments, the altitude can be determined using another type of altimeter. In certain embodiments, the location module 201 can be a means for determining a location of the UE 101, an image, or used to associate an object in view with a location.

The magnetometer module 203 can be used in finding horizontal orientation of the UE 101. A magnetometer is an instrument that can measure the strength and/or direction of a magnetic field. Using the same approach as a compass, the magnetometer is capable of determining the direction of a UE 101 using the magnetic field of the Earth. The front of a media capture device (e.g., a camera) can be marked as a reference point in determining direction. Thus, if the magnetic field points north compared to the reference point, the angle the UE 101 reference point is from the magnetic field is known. Simple calculations can be made to determine the direction of the UE 101. In one embodiment, horizontal directional data obtained from a magnetometer can be stored in memory module 219, made available to other modules and/or applications 103 of the UE 101, and/or transmitted via the communication interface 215 to one or more entities of the system 100.

The accelerometer module 205 can be used to determine vertical orientation of the UE 101. An accelerometer is an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a UE 101 is stationary, the accelerometer module 205 can determine the angle the UE 101 is pointed as compared to Earth's gravity. In certain embodiments, the magnetometer module 203 and accelerometer module 205 can be means for ascertaining a perspective of a user. This perspective information may be stored in the memory module 219, made available to other modules and/or applications 103 of the UE 101, and/or sent to one or more entities of the system 100.

In various embodiments, the sensors module 207 can process sensor data from various sensors (e.g., GPS, accelerometer, gyroscope, thermometer, etc.) to determine environmental (e.g., atmospheric) conditions surrounding the UE 101, user mood (e.g., hungry, angry, tired, etc.), location information, and various other information from a range of sensors that may be available on one or more devices. For example, the sensors module 207 may detect conditions including humidity, temperature, geo-location, biometric data of the user, etc. Once again, this information can be stored in the memory module 219 and sent to the context processing module 217 and/or to other entities of the system 100. In certain embodiments, information collected from the DC collection module 115 can be retrieved by the runtime module 211 and stored in memory module 219, made available to other modules and/or applications 103 of the UE 101, and/or sent to one or more entities of the system 100.

In one embodiment, the multimedia module 209 may be utilized to capture various media items, for example, graphical encoded data representations, images, video, audio, and the like, wherein the captured media may be submitted to one or more modules and applications of the UE 101, a service provider, and/or a content provider for further processing, storage, sharing, and the like. For example, a captured image of a graphical encoded data representations may be submitted to a service provider and/or the context processing module 217 for analysis and/or decoding. In one embodiment, the multimedia module 209 may also be utilized to process various media items for determining one or more elements present in the media item. For example, a media item may be a picture that may include images of people, POIs, objects, buildings, etc. In one embodiment, the multimedia module 209 may use one or more image processing algorithms for processing a media item and for identifying one or more elements present into media item. For example, the media item may be an audio recording, which may include various sounds of people, objects, or the surroundings with the media item were recorded.

In various embodiments, the runtime module 211 may cause one or more modules/components of a UE 101 to associate one or more available data items with one or more content consumption sessions at a UE 101. For example, date, time, location, and user information associated with a device at a particular time may be associated (e.g., as metadata) with a content consumption sessions.

The user interface 213 can include various methods of communication. For example, the user interface 213 can have outputs including a visual component (e.g., a screen), an audio component, a physical component (e.g., vibrations), and other methods of communication. User inputs can include a touch-screen interface, a scroll-and-click interface, a button interface, a microphone, etc. Input can be via one or more methods such as voice input, textual input, typed input, typed touch-screen input, other touch-enabled input, etc.

In one embodiment, the communication interface 215 can be used to communicate with one or more entities of the system 100. Certain communications can be via methods such as an internet protocol, messaging (e.g., SMS, MMS, etc.), or any other communication method (e.g., via the communication network 111). In some examples, the UE 101 can send context information associated with the UE 101 to the service providers 105, content providers 107, and/or to other entities of the system 100.

The context processing module 217 may be utilized in determining context information from the DC module 115 and/or applications 103 executing on the runtime module 211. This information may be caused to be transmitted, via the communication interface 215, to the service providers 105 and/or to other entities of the system 100. The context processing module 217 may additionally be utilized as a means for determining information related to the user, an instance of data, a value, a content item, an object, a subject, and the like. In certain embodiments, the context processing module 217 can infer higher level context information from the context data such as favorite locations, significant places, common activities, interests in products and services, POIs at various geo-locations, etc.

Figure 3:
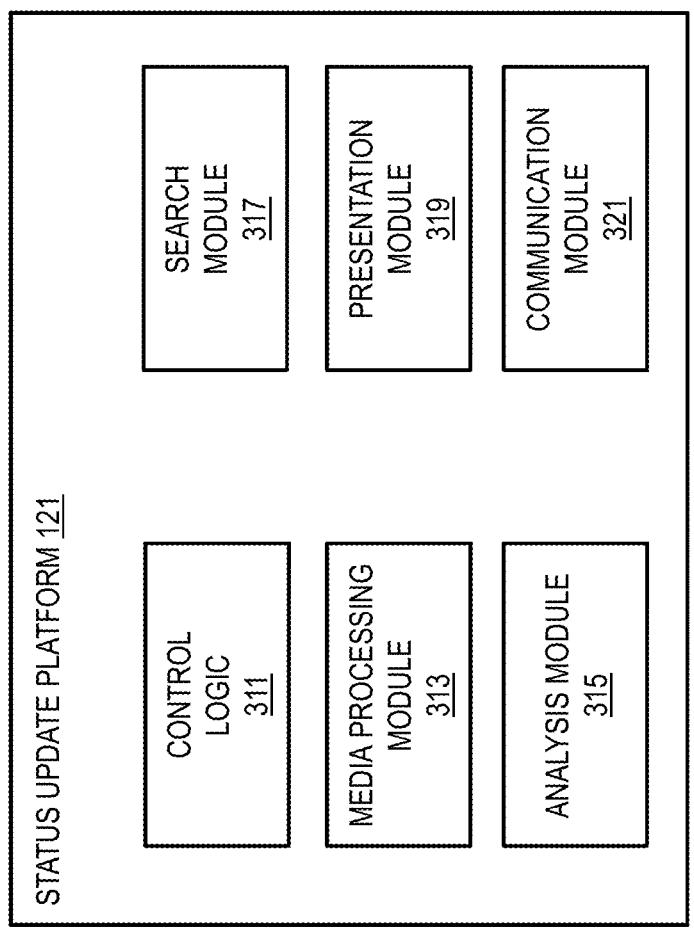
FIG. 3 is a diagram of components of an update platform, according to an embodiment.

FIG. 3 is a diagram of the components of the status update platform, according to an embodiment. By way of example, the status update platform 121 includes one or more components for determining and presenting status updates associated with various elements in one or more media items. It is contemplated that the functions of these components may be combined in one or more components or performed by other components of equivalent functionality. In this embodiment, the status update platform 121 includes a control logic 311, media processing module 313, analysis module 315, search module 317, presentation module 319, and a communication module 321. As previously discussed, a media item may be processed to determine or identify one or more elements depicted therein for determining current status information associated with the one or more elements. In various embodiments, the status update platform 121 may be implemented as a stand-alone element of the system 100, or may be partially or completely implemented in a service provider 105, a content provider 107, and/or in a UE 101.

In one embodiment, the control logic 311 and the media processing module 313 may determine a request/input from a user for determining a current status information associated with one or more elements present in a media item. For example, the user may have a picture from several years ago depicting several friends, and now the user would like to find current status information on one or more of the depicted friends. In one embodiment, the media processing module 313 may utilize one or more suitable applications, algorithms, or software to process the media item and determine one or more elements present in the media item. For example, the media item may be a picture, a video or an audio recording. In one scenario, an audio recording may be analyzed to determine various sounds and audio elements that may have been captured in the recording. In one embodiment, a user may select one or more elements present in a media item for the processing and to determine associated current status information.

In one embodiment, the media processing module 313 may indicate to a user whether it has detected any elements in a given media item. For example, it is possible that one or more elements present in a media item is not detected, which may be due to one or more parameters associated with the media item, e.g., picture quality.

In one embodiment, the control logic 311 and the analysis module 315 may cause a further processing of or an analysis of the results from the media processing module 313 in order to identify one or more elements present in the processed media item. In one example, the analysis module 315 and/or the media processing module 313 may utilize an image recognition algorithm for identifying an element present in the media item. In one embodiment, the image recognition may identify distinct characteristics associated with an element present in the media item. In one use case scenario, the analysis module 315 may determine and sort the identity information associated with a plurality of elements present in a media item so that a current status information potentially may be determined for each element. For example, a video recording may include images of several individuals and the analysis module 315 can determine image recognition data for each of the individuals. In one embodiment, the analysis module 315 may cause a comparing of one or more elements present in a media item with one or more elements present in one or more other media items. For example, image of a building depicted in a first media item may be compared to one or more images of one or more buildings depicted in one or more other media items.

In one embodiment, the control logic 311 and search module 317 may cause one or more searches in various databases for status information associated with one or more elements identified in one or more media items. For example, the search module 317 may utilize the analysis results from the analysis module 315 and/or the processing results from the media processing module 313 conduct the one or more searches. In various scenarios, various available databases (e.g., public, private, governmental, social networking, etc.) may be accessed and utilized to conduct the one or more searches. In one embodiment, one or more credentials associated with a user who is requesting the status update information may be requested and utilized for accessing the various available databases. For example, a user may have requested status update information associated with an old friend in a picture so here the user's credentials to a social networking site may be utilized in order to gain access to information on individuals who potentially may be that old friend in the picture. In one embodiment, a tagging information (e.g., name, address, date/time, etc.) associated with a certain element in a media item may be utilized to determine one or more potential databases which may be include status update information on that certain element. In one embodiment, the search module 317 may utilize metadata (e.g., date/time, location, event, POI information, etc.) associated with a media item in order to determine an appropriate search plan. In one embodiment, the one or more searches may be based on a media item containing an element, which is the subject of a search. In one use case scenario, an image recognition information associated with one or more other media items, which may be same/similar to a media item of interest, may be utilized to conduct one or more searches for status update information on the media item of interest.

In one embodiment, the presentation module 319 may cause a presentation of the status update information associated with one or more elements in a media item, wherein the presentation may be via one or more applications, modules, or software at one or more user devices. In one example, the presentation may include visual effects on the one or more elements and/or on the media item. In various scenarios, the presentation may include one or more AR or VR elements, which may provide additional visual effects for a better, more effective, or user friendly experience. In one embodiment, the presentation module 319 may cause a presentation of a UI at a user device so that a user may interact with one or more elements present in a media item, in one or more other media items, one or more current status update information, or the like. In one embodiment, the UI may provide various options for a user to select, highlight, hover over, etc. one or more elements in a media item.

In one embodiment, the communication module 321 can be used to communicate with one or more entities of the system 100. Certain communications can be via methods such as an internet protocol, messaging (e.g., SMS, MMS, etc.), or any other communication method (e.g., via the communication network 111). In some examples, the UE 101 can send context information associated with the UE 101, user information, media items, user interactions, or the like to the status update platform 121, the service providers 105, the content providers 107, and/or to other entities of the system 100.

Figure 4:
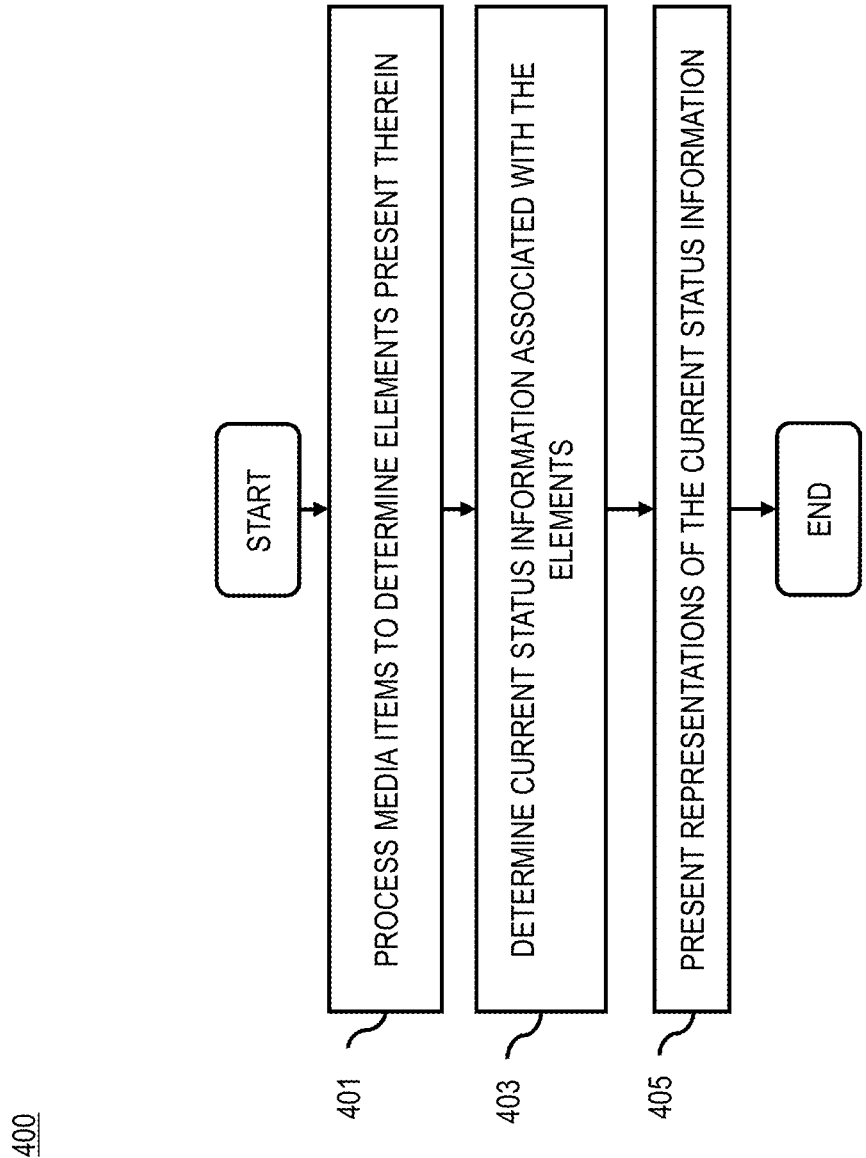
FIGS. 4 through 6 illustrate flowcharts of various processes for, at least, determining and presenting status updates associated with elements in a media item, according to various embodiments.
Figure 5:
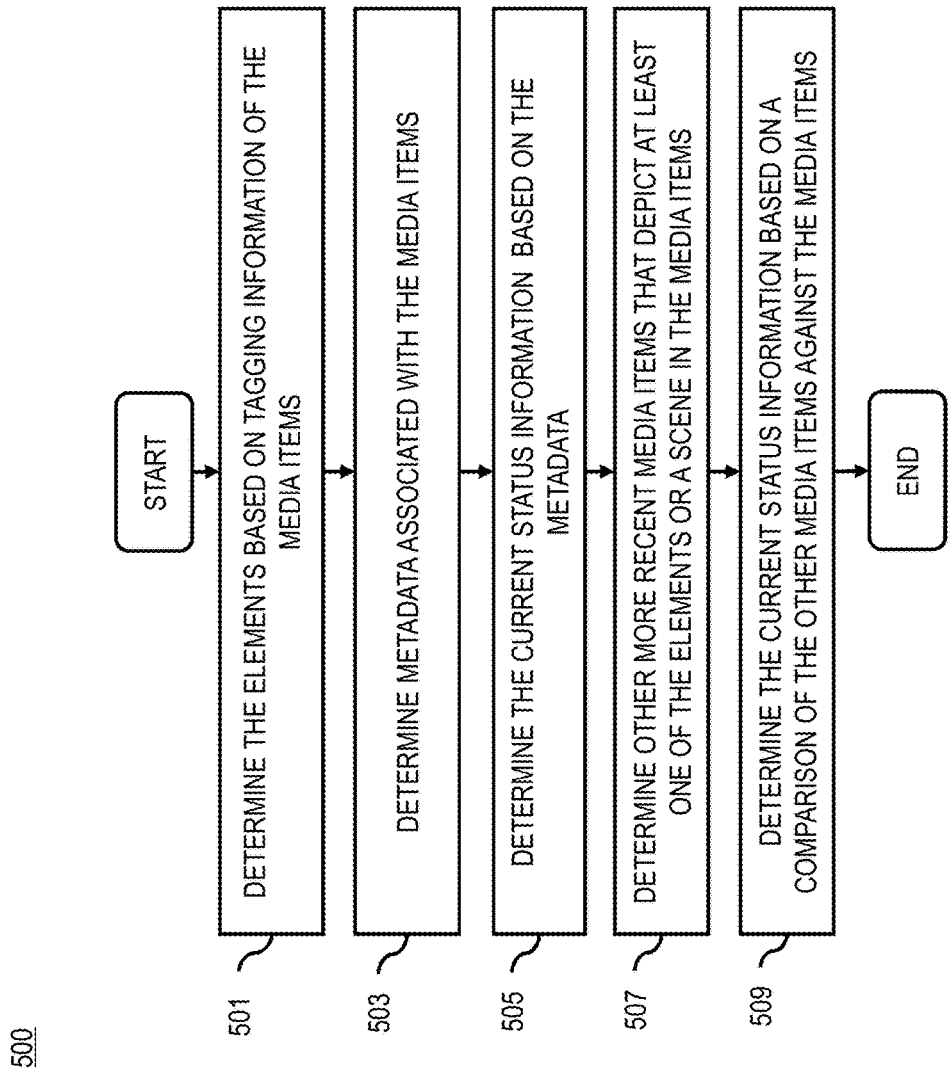
Figure 6:
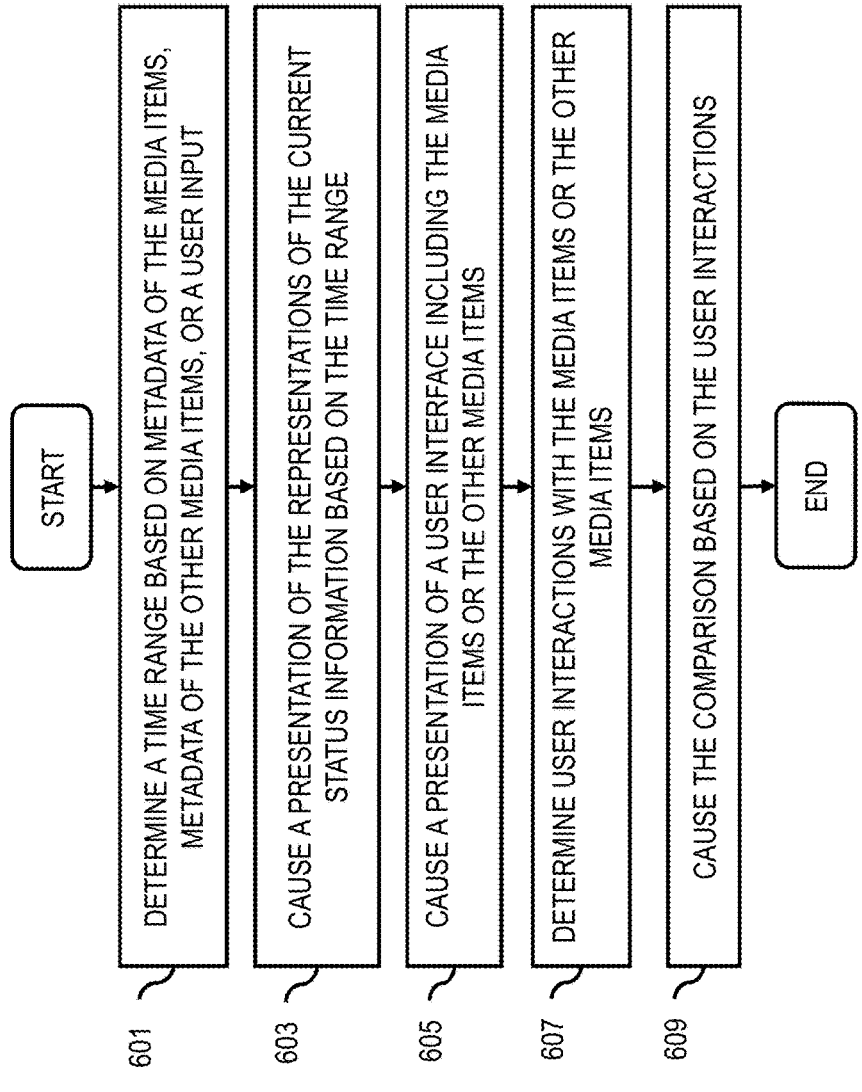
Figure 9:
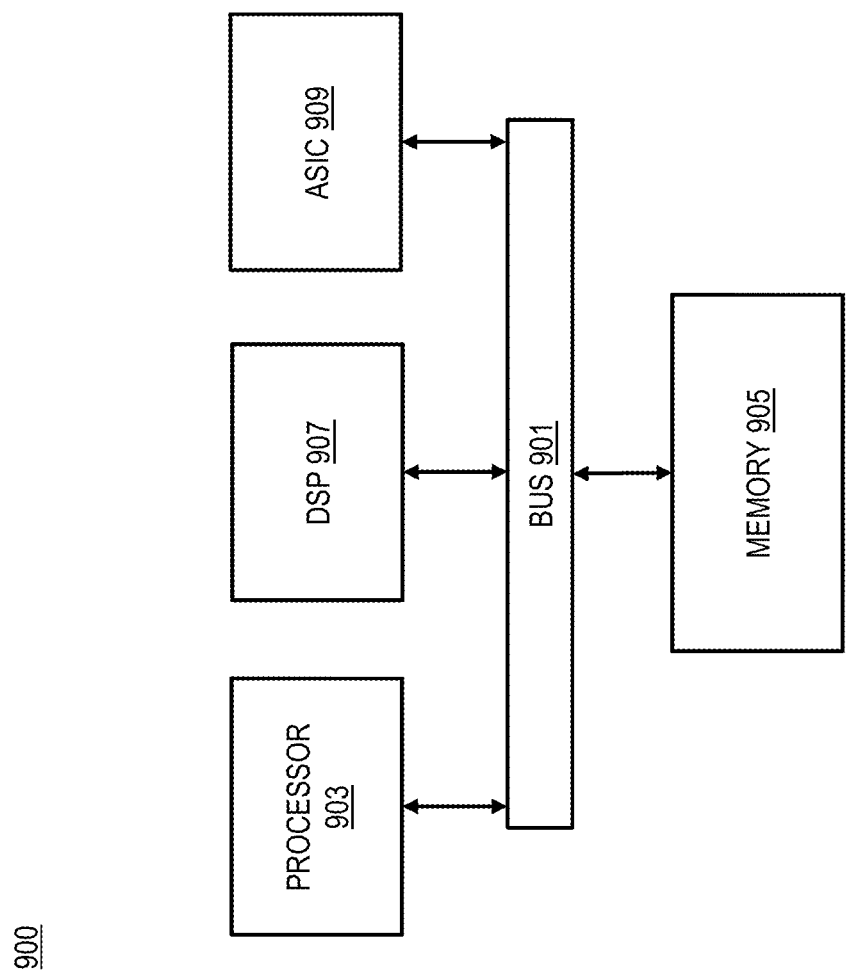
FIG. 9 is a diagram of a chip set that can be used to implement an embodiment of the invention.

FIGS. 4 through 6 illustrate flowcharts of various processes for, at least, determining and presenting status updates associated with various elements in one or more media items, according to various embodiments. In various embodiments, the status update platform 121 may perform processes 400, 500, and 600 that may be implemented in, for instance, a chip set including a processor and a memory as shown in FIG. 9. As such, the status update platform 121 can provide means for accomplishing various parts of the process 400, 500, and 600 as well as means for accomplishing other processes in conjunction with other components of the system 100. Throughout this process, the status update platform 121 may be referred to as completing various portions of the processes 400, 500, and 600; however, it is understood that other components of the system 100 can perform some of and/or all of the process steps. Further, in various embodiments, the status update platform 121 may be implemented in one or more entities of the system 100.

Referring to FIG. 4, the process 400 begins at step 401 where the status update platform 121 may process and/or facilitate a processing of one or more media items to determine one or more elements present in the one or more media items. In various embodiments, one or more applications or algorithms may perform one or more image processing, video processing, audio processing, or the like procedures on the one or more media items for determining the one or more elements. For example, an image processing of a picture may detect people, building, POIs, objects, etc. depicted in the picture. In one embodiment, an element detected in a media item may be compared to other elements of similar/same type in one or more databases in order to ascertain as to what that element is. For example, an element detected in a picture may be of a person, a car, a building, a dog, or other objects, which may be compared to elements in databases containing similar type elements. In one embodiment, a facial recognition algorithm, application, or software may be utilized to process an element including a depiction of a person so that it can be determined who that person is or was. For example, facial recognition data of a person may be compared to the same type of data in one or more databases/sources (e.g., public, private, government, paid, free, social networking sites, etc.) in order to identify that person. In one example, an image of a building may be compared with information in one or more databases in order to determine where and what that building is or was.

In step 403, the status update platform 121 may determine a current status information associated with the one or more elements. In one embodiment, identification information associated with an element may be utilized to conduct one or more searches in one or more databases for determining current status information associated with that element. In various embodiments, the current status information includes geographical information, physical characteristics, personal relationship information, or a combination thereof. In one example, a current status information associated with a building may indicate that the building no longer exists and now there is a new building in its place. In another example, the current status information may indicate that the exterior of the building has been remodeled. In one example, a current status information associated with a person may indicate various changes in the person's physical characteristics, personal relationships, geographical location, employment, education, etc. In various examples, the current status information for various elements in a media item may be determined from various databases (e.g., public, private, government, paid, free, etc.) where the information may be from a marriage license, a birth certificate, a death certificate, a sale of a property, school records, or the like.

In step 405, the status update platform 121 may cause, at least in part, a presentation of one or more representations of the current status information. In various embodiments, the current status information may be presented as a graphical representation, textual information, audio, or the like. In various examples, the current status information may be presented along with the original media item so that a user may see the potential status changes. In one example, the current status information may include relational links among a plurality of people depicted in a media item.

Referring to FIG. 5, the process 500 begins at step 501 where the status update platform 121 may determine the one or more elements based, at least in part, on tagging information associated with the one or more media items. In one scenario, at the time when a media item was created, a user may have tagged one or more elements in the media item with information that may have been important or of interest to the user. For example, a user may have tagged a building in a picture of a college campus, which the user attended, with information indicating that his first and/or his final college classes were in that building. In one example, a user may have an old picture that depicts an old factory building where his grandfather had his first job at, and the user may digitize that picture and tag it with that information. In one embodiment, the tagging of the information may be done by a device utilized to create a media item. In various cases, the tagging information may include exact or approximate information, which may be utilized to determine one or more elements in a media item. For example, the tagging information of an element in a media item may include a name of a person, location information, relevance to other elements in the media item (e.g., siblings, parents, friends, my parents' house, my son's first bicycle, etc.) or the like.

In step 503, the status update platform 121 may determine metadata associated with the one or more media items. In various examples, the metadata may have been added by a device used to create the media item and/or by a user, where the metadata may indicate how the media item was created, purpose of the media item, time and date of creation, elements in the media item, creator of the media item, location where the media item was created, media item data type, size of a digital media item file, image/audio quality parameters of the media item, or the like.

In step 505, the status update platform 121 may determine the current status information based, at least in part, on the metadata. For example, the location information may indicate a potential location of an element, e.g., a building, a person, a car, or the like, that may be present in the media item, wherein that location information may be used to search for a current status information associated with that element. In one example, the metadata may indicate information of an event where the media item was created at, wherein that event information may be used to search for a current status information on the elements present in that media item. In one embodiment, the metadata include, at least in part, contextual information associated with a capture of the one or more media items. In one example, the contextual information may be indicative of a relevance of a media item to a user, and may further help to identify people, POI, objects or the like. Further, the contextual information may provide detailed information about the elements identified in the media item, e.g., birth dates, wedding dates, event location, geographical location, themes, dates, etc.

In step 507, the status update platform 121 may determine one or more other media items that depict (a) at least one of the one or more elements, (b) a scene depicted in the one or more media items, or (c) a combination thereof, wherein the one or more other media items are captured in a more current time period than the one or more media items. In one embodiment, the one or more other media items may be found in one or more public, private, government, or the like databases. For example, the system 100 may have determined that there is a person depicted in an first picture, and it may use that depiction (e.g., image recognition data) to search through the one or more databases in order to find another picture that would include a similar/matching depiction of a person. In one example, the first picture may include a depiction of a scene including various elements, e.g., buildings, POIs, objects, etc., where the image recognition data for the one or more elements may be used to search through the one or more databases for media items that may include at least one of the one or more elements. In one embodiment, a particular element in a media item may be tagged for conducting the search for the one or more other media items.

In step 509, the status update platform 121 may determine the current status information based, at least in part, on a comparison of the one or more other media items against the one or more media items. In one scenario, the current status information may be based on a comparison of an element depicted in a media item to a similar/same element depicted in the other media item. For example, the image of a person, object, building, POI, etc. present in a first media item may be compared to an image of a person, object, building, POI, etc. present in another media item, wherein the elements compared may potentially be the same person, object, building, POI, etc. In one embodiment, the current status information may be based on a comparison of physical characteristics associated with an element in a media item compared to physical characteristics associated with a similar/same element in another media item. For example, the facial features of a person depicted in a first picture may be compared to facial features of the same person depicted in another picture, which may indicate some changes to the facial features (e.g., different hair color/style). In one embodiment, the current status information may be based on information associated with an element present in one or more other media items. For example, a comparison of a first and second pictures indicates that a person depicted in the first picture is the same or most likely the same person depicted in the second picture. In one embodiment, the current status information and the one or more other media items are determined from one or more public sources, one or more private sources, or a combination thereof. In one scenario, the image information of the person depicted in the second picture may be used to conduct a search via one or more data sources, e.g., a social networking site, to determine the current status information associated with the person depicted in the second picture who is the same or most likely the same person depicted in the first picture. In various scenarios, the same approach may apply to other types of elements present in various types of media items. For example, the elements may include buildings, POIs, objects, cars, animals, other structures, or the like, wherein the media items may include an image, a video or audio recording, and the like.

In one embodiment, the presentation of the current status information includes one or more visual effects associated with the one or more elements present in the one or more media items, the one or more other media items, or a combination thereof. In one embodiment, the presentation of a current status information may include one or more visual effects, which may be caused by one or more applications, software, algorithms, or the like. In one scenario, updates to an element in a media item may be shown by highlighting, fading out, etc. the element based on the updates. For example, if the update status information on a building in a media item indicates that that building is no longer there, then the image of that building in the media item may be faded out and provide a visual indicator to the user. In one example, changes to physical characteristics of a person present in a media item may be highlighted in order to show changes to the facial features, hair, height, or the like.

Referring to FIG. 6, the process 600 begins at step 601 where the status update platform 121 may determine a time range based, at least in part, on the metadata associated with the one or more media items, metadata associated with the one or more other media items, a user input, or a combination thereof. In one use case scenario, a service provider may determine a time interval between a first media item and a second media item from the metadata associated with the first and the second media items. For example, the first media item may be a picture that was taken several years ago and the second media item may be another picture that was taken several months ago. In one embodiment, a user may indicate the time range of interest for determining and presenting any available current status information. For example, a service provider may have determined a plurality of status updates associated with a certain POI during a five-year period; however, the user may be interested in the status updates available only for the past two years. In various embodiments, the time range may be associated with a user, a user device, type of media items, type of elements in a media item, tagging information, metadata information, or the like.

In step 603, the status update platform 121 may cause, at least in part, the presentation of the one or more representations of the current status information based, at least in part, on the time range. In one embodiment, the update status information may be presented as a plurality of updates which may have been determined for that time interval. For example, the first picture created five years ago includes a depiction of a certain person and a second picture created six months ago includes a depiction of that same person, wherein the update status information may be presented along a timeline from five years ago to the time of the second picture, six months ago. In various scenarios, the plurality of media items during that time range may be determined from various sources, for example, public records, school graduations, wedding registries, or the like, wherein the plurality of media items may allow a user to see the changes/transformations that are associated with an element in a media item over a certain time period.

In step 605, the status update platform 121 may cause, at least in part, a presentation of a user interface including the one or more media items, the one or more other media items, or a combination thereof. In one embodiment, a user interface including a first media item and/or a second media item may be presented at a user device, wherein the first and/or second media items may be available from the user device, a local storage, a remote storage, or the like. In one example, a user may select the first and/or the second media item. In various embodiments, the UI may be presented by one or more applications at the user device, by a service provider, or the like.

In step 607, the status update platform 121 may determine one or more user interactions with the one or more media items, the one or more other media items, or a combination thereof. In one embodiment, a user may choose to interact with a media item where one or more elements may be present. In one use case scenario, the user may select, highlight, hover over, one or more elements in a media item. For example, the UI may provide one or more options for the user to select one or more elements in a media item via one or more UI options, e.g., highlight, click, hover over, or the like. In one example, a user may select a specific element in a first media item that the user may wish to determine a current status information for. In one example, the user may select a specific element in a first media item and a specific element in a second media item for determining the current status information associated with those elements.

In step 609, the status update platform 121 may cause, at least in part, the comparison based, at least in part, on the one or more user interactions. In one example, a service provider may cause the comparison of one or more elements in a first media item with one or more elements in a second media item. In one embodiment, a presentation of one or more representations of a current status information is based, at least in part, on the one or more user interactions. For example, the user interactions may indicate that the user wishes for a presentation of a current status information for only a certain element present in a media item. In one example, a service provider may determine the presentation of the one or more representations of a current status information based on the user interaction and an availability of the current status information associated with the one or more elements in a media item.

FIGS. 7A through 7D illustrate example media items and UI diagrams utilized in the processes of the FIGS. 4 through 6, according to various embodiments.

Figure 7A:
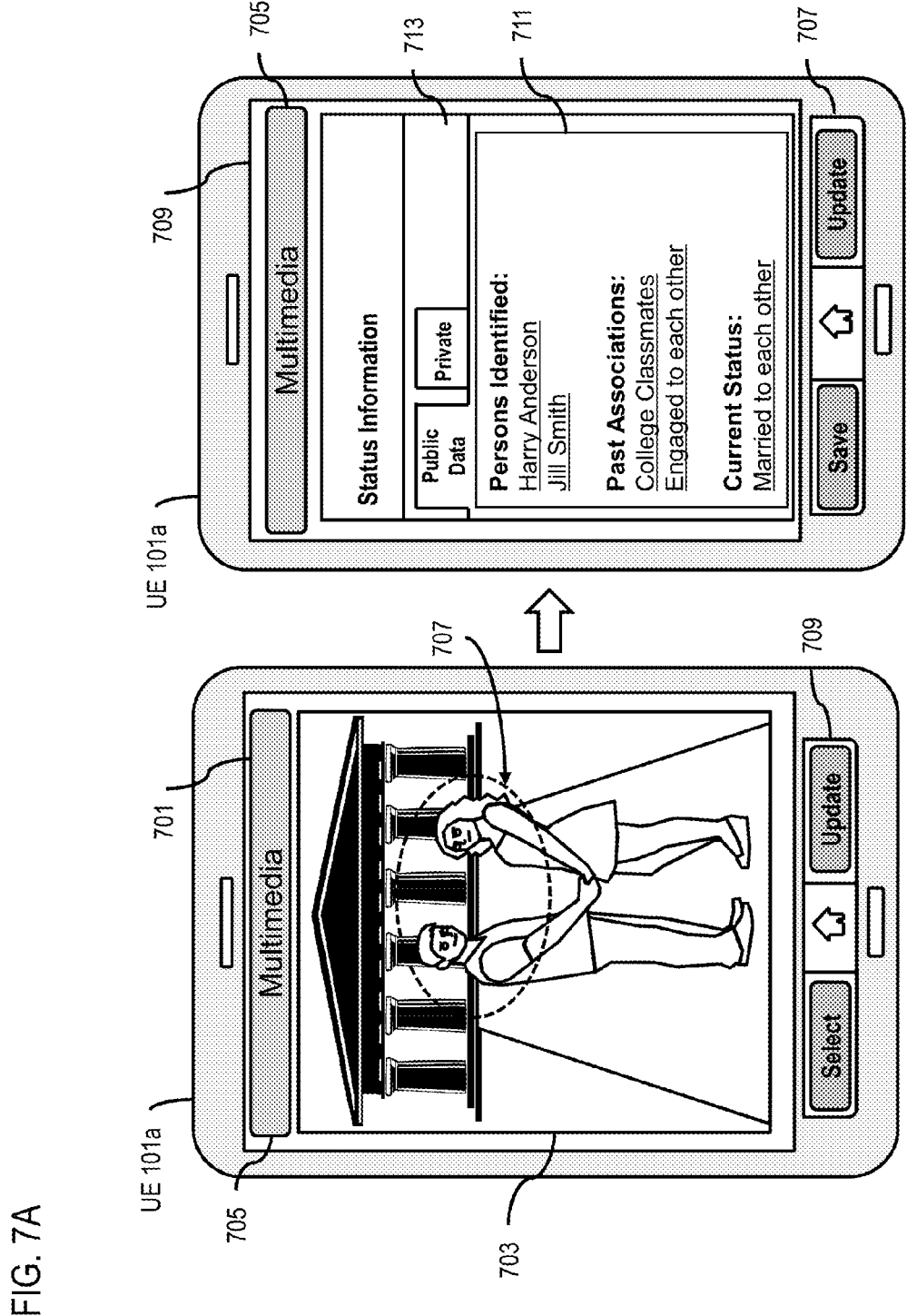
FIGS. 7A through 7D illustrate example user interface diagrams utilized in the processes of the FIGS. 4 through 6, according to various embodiments.

FIG. 7A includes example UI illustrations 701 and 709 on a UE 101a. As shown, in one embodiment, a user may utilize the UI 701 to access and consume a media item 703 via a multimedia application 705 (e.g., application 103). In one example, the media item 703 may include one or more elements 707, e.g., depiction of two persons. In use case scenario, a user may utilize one or more UI options 709 to select one or more of the elements 707 and request a current status information. In one embodiment, the status update platform 121 may process the request and perform various processes for determining and presenting the requested current status information. As discussed earlier, the status update platform 121 may access various databases for determining the current status information. In one embodiment, the status update platform 121 may cause a presentation of the UI 709, which may include current status information 711 associated with the elements 707 of the media item 703. In this example, the current status may include various information items indicating that the status update platform 121 has identified two persons (e.g., Harry Anderson and Jill Smith), past associations of the two persons (e.g., they were college classmates were also engaged to each other), and current status (e.g., married to each other). In various embodiments, the status information 711 may include various past or present information that may be categorized according to the available information types 713. In one example, the status information 711 may include information, which may have been determined from one or more public data sources as well as information which may be available from private sources. For instance, the information from private sources may require additional user authorization, credentials, fees, or the like. Also, the status information may include graphical as well as textual representations. In one use case scenario, the user may select to save the updated status information via the user options 707, wherein the options may be dynamically presented based on possible available actions.

In one embodiment, status update platform 121 may periodically (e.g., every six months, every summer, every Christmas, etc.) analyze the current status information associated with one or more elements in one or more media items for determining any potential updates on the one or more elements. In one scenario, if there are any updates, then the status update platform 121 may update the metadata of the media items associated with those elements that have updates. In one example, updated metadata of a media item in a user's collection may be indicative of possible updates to that media item (e.g., has outdated information), which would make it easier for the user to take notice and enquire (e.g., online, directly, automatically, etc.) about those possible updates. In one use case, a user may be viewing a collection of pictures where several of them may be tagged with notifications indicative of possible updates on the elements in those tagged pictures.

In one embodiment, a user may create one or more updating configurations, which may include a user profile, user preferences, device configuration, etc. and then associate the updating configurations with a user account, a user device, media items, media collections, social networking sites, or the like. In one example, an updating configuration may indicate to the status update platform 121 that the user wishes to receive notifications on any updates on a specific element (e.g., a tagged image of a friend in a picture) or a group of elements (e.g., former classmates in a video) in one or more media items associated with the user. In one example, the user may be interested only in updates that are due to one or more specific events (e.g., a child birth, a marriage, significant changes to a city's skyline image, etc.) that may be associated with any/all elements in any/all media items of the user.

Figure 7B:
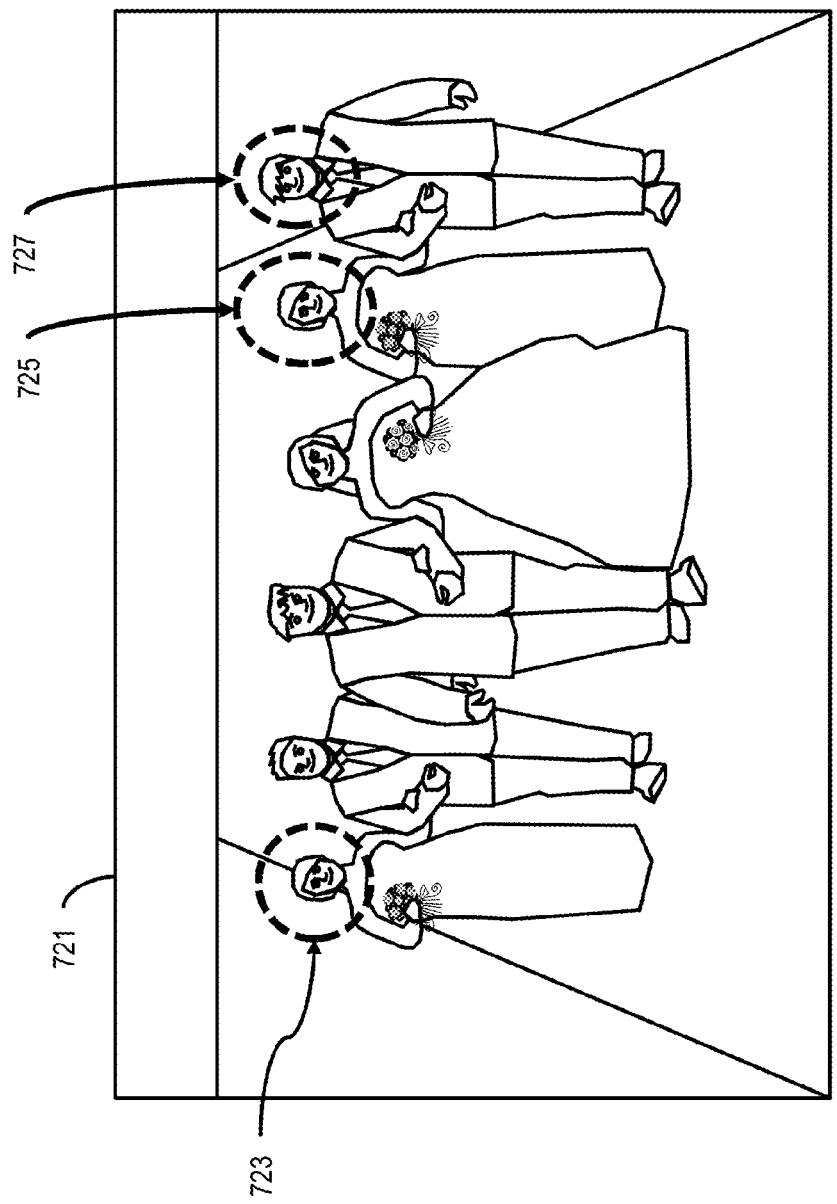

FIG. 7B includes example media item 721 which depicts a group of individuals, for example, a wedding party. In one embodiment, a user may utilize various UI options on a user device 101 to interact with the media item 721. In one example, the user may select, highlight, hover over, etc. one or more elements present in the media item 721. In one use case scenario, the user may select elements 723, 725, and 727. In one example, the user may have selected said elements to indicate that he only requests current status information on the selected elements. In one scenario, the user may tag the selected elements with one or more information items, which may be used during a search for the current status information associated with the selected elements. In another example, the user may utilize one or more UI options to hover over (e.g., mouse pointer moved over the element 723 in the media item 721) the selected elements in order to view any available information associated with a selected element. For instance, the name of the person in 723 may be displayed at the user device 101. In one embodiment, UI options at a user device 101 may allow interaction only with those elements which may be identified in a media item. For example, it is possible that not all individuals depicted in the media item 721 can be identified.

Figure 7C:
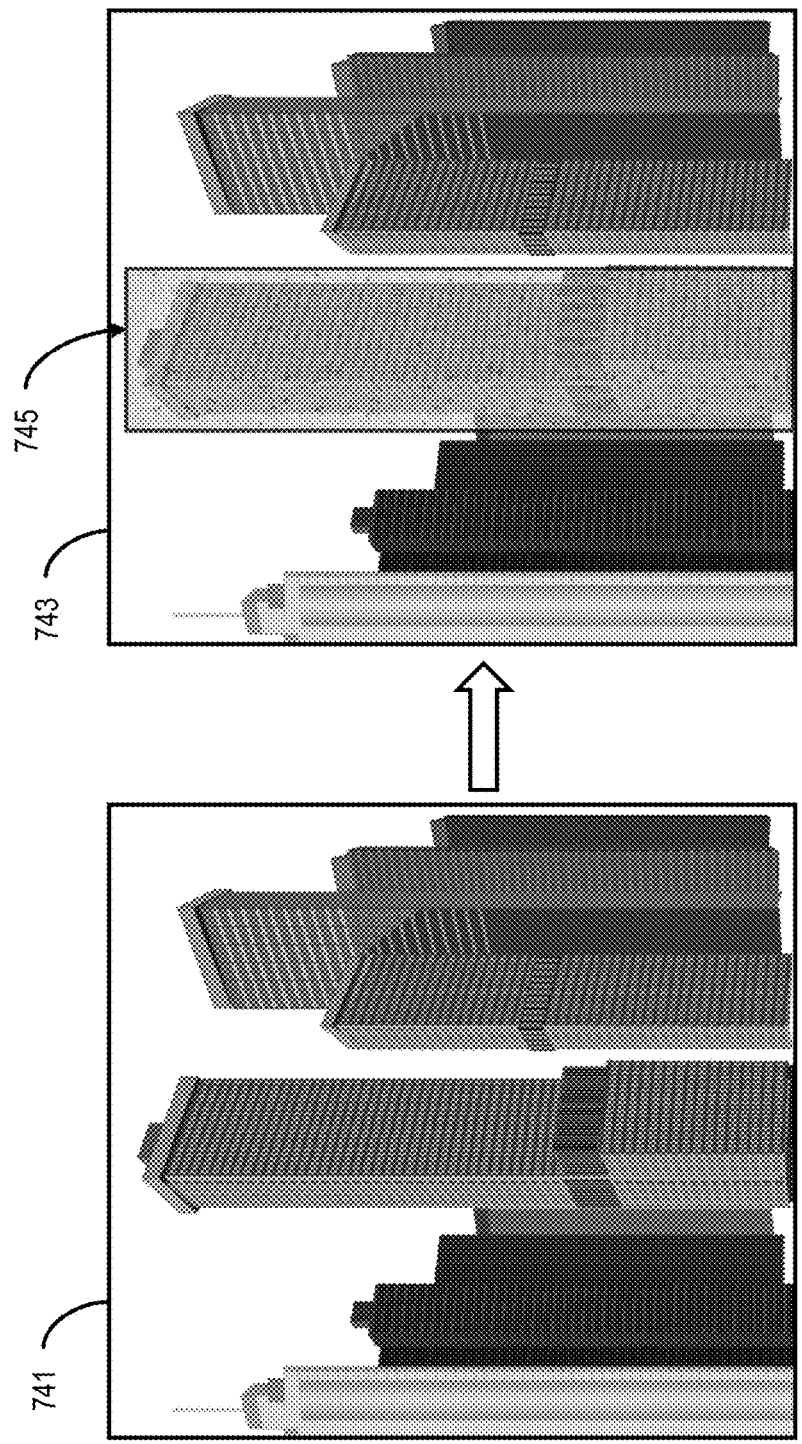

FIG. 7C includes media item 741 depicting a plurality of elements, for example, several buildings at a particular city center. In one example, a user may wish to determine current status information associated with any of the elements of the media item 741. In one embodiment, the status update platform 121 may process the media item 741 and compare it to similar media items that may contain similar/same elements as the media item 741. In one scenario, the status update platform 121 may present a media item 743, which may be substantially similar/same as the media item 741, wherein any changes in the status of the elements of the media item 741 may be represented to include visually highlighted/identified status update 745. For example, the building highlighted in 745 may indicate that the building is no longer present in the media item 743. Additionally, the status update platform 121 may confirm the status update 745 by searching through one or more databases and provide additional accuracy to the user. For instance, in addition to the media item 743 a textual message may indicate that the building highlighted in 745 was demolished in order to make room for a bigger building in its place.

Figure 7D:
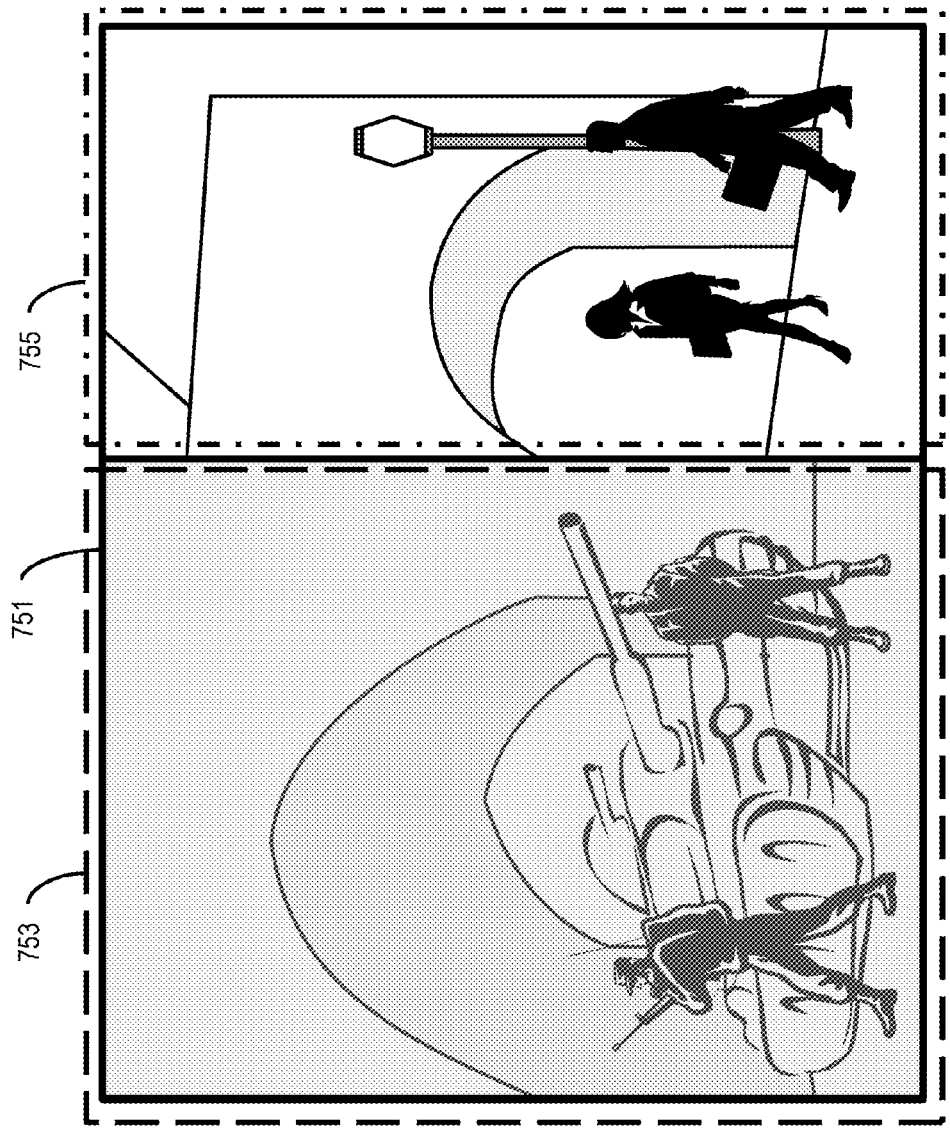

In FIG. 7D, the status update platform 121 may present a representation of current status information by providing additional graphical and visual effects associated with one or more elements in a media item. In one use case scenario, current status information associated with a media item 751 may include an element 753 and an element 755, wherein the element 753 may be an older depiction of an element in the media item 751, and wherein the element 755 may depict a current depiction of an element in the media item 751. For example, the media item 751 is of a certain POI, wherein the element 753 shows a portion of the same POI captured many years ago (e.g., a historical scene), and wherein the element 755 shows a portion of the media item 751 at present time. In one scenario, a presentation of past and current status information associated with various elements of a media item may provide for a better user experience, visualization, and comprehension of possible changes that the elements in a media item may have gone through.

The processes described herein for determining and presenting status updates associated with one or more elements in a media item may be advantageously implemented via software, hardware, firmware, or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
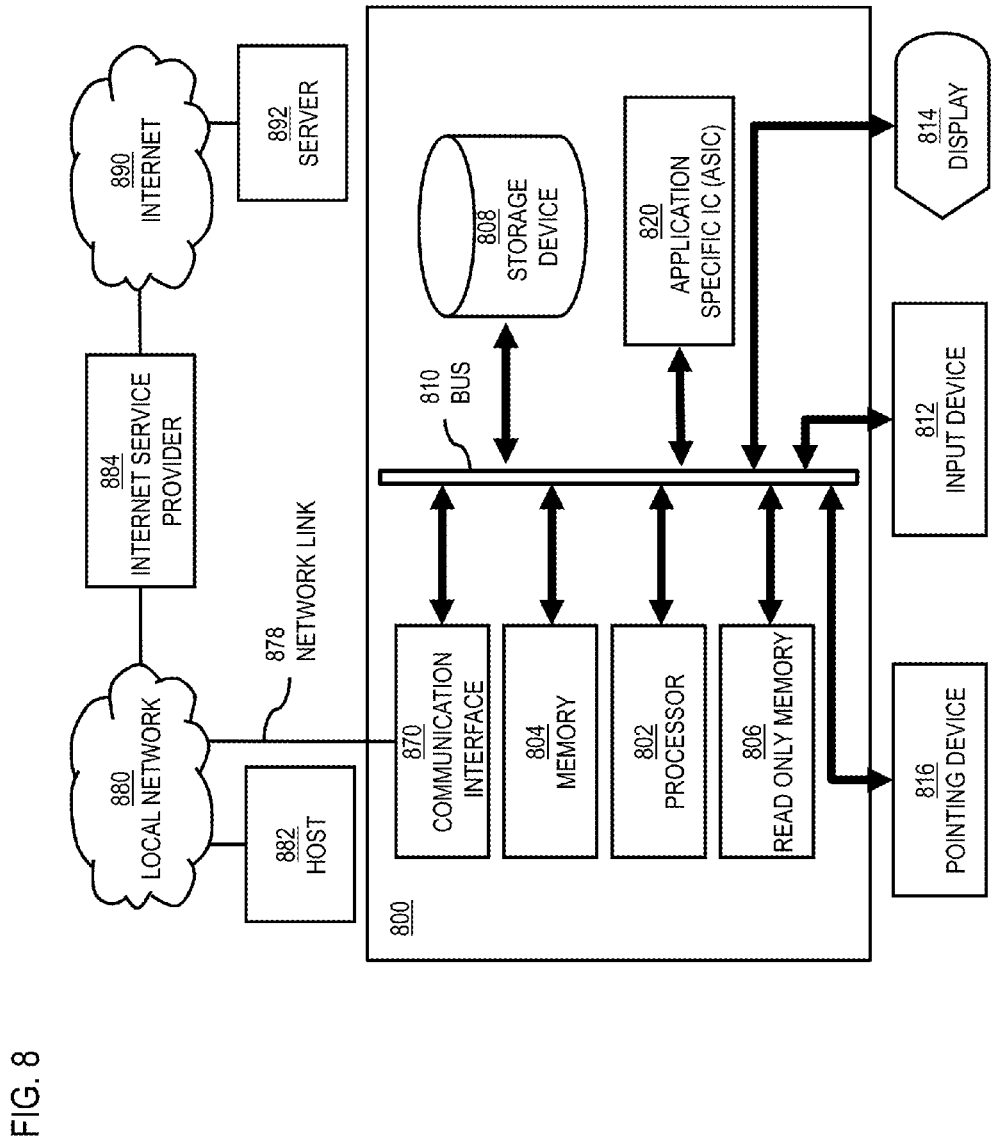
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to determine and present status updates associated with one or more elements in a media item as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of determining and presenting status updates associated with one or more elements in a media item.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to determining and presenting status updates associated with one or more elements in a media item. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for determining and presenting status updates associated with one or more elements in a media item. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for determining and presenting status updates associated with one or more elements in a media item, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814, and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners, and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic, or electromagnetic signals, including infrared and optical signals that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 111 for determining and presenting status updates associated with one or more elements in a media item.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880, and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed for determining and presenting status updates associated with one or more elements in a media item as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing UI navigation information associated with the availability of functions. Chip set or chip 900, or a portion thereof, constitutes a means for performing one or more steps of determining and presenting status updates associated with one or more elements in a media item.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to determine and present status updates associated with one or more elements in a media item. The memory 905 also stores the data associated with or generated by the execution of the inventive steps.

Figure 10:
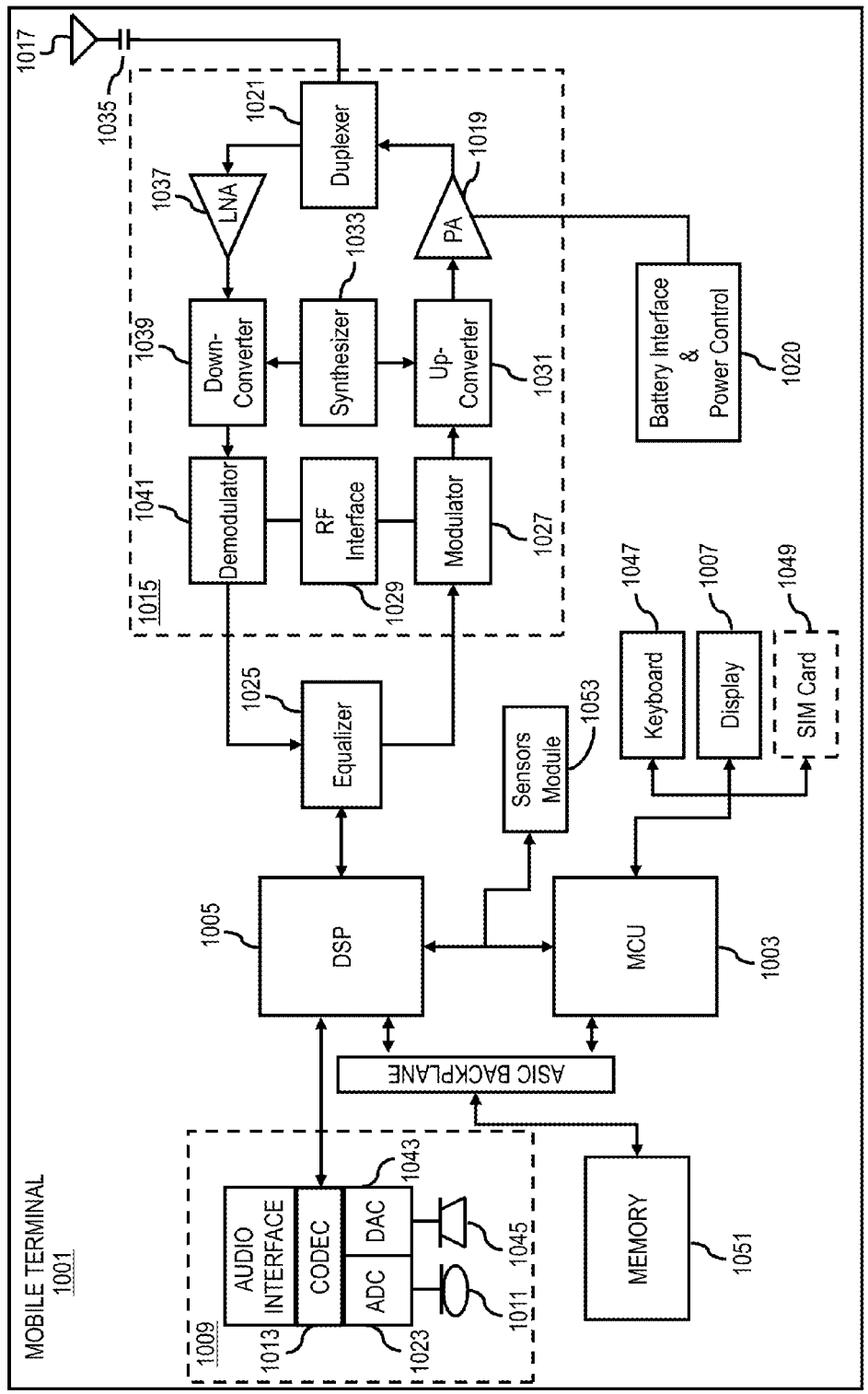
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of determining and presenting status updates associated with one or more elements in a media item. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of determining and presenting status updates associated with one or more elements in a media item. The display 1007 includes display circuitry configured to display at least a portion of a UI of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a UI circuitry for managing user input. The MCU 1003 runs a UI software to facilitate user control of at least some functions of the mobile terminal 1001 for determining and presenting status updates associated with one or more elements in a media item. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

Additionally, sensors module 1053 may include various sensors, for instance, a location sensor, a speed sensor, an audio sensor, an image sensor, a brightness sensor, a biometrics sensor, various physiological sensors, a directional sensor, and the like, for capturing various data associated with the mobile terminal 1001 (e.g., a mobile phone), a user of the mobile terminal 1001, an environment of the mobile terminal 1001 and/or the user, or a combination thereof, wherein the data may be collected, processed, stored, and/or shared with one or more components and/or modules of the mobile terminal 1001 and/or with one or more entities external to the mobile terminal 1001.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   processing at least one picture to determine an identity of at least one element present in the at least one picture;
   determining current status information associated with the at least one element based on the identity,
   determining that the current status information indicates a change of status of the at least one element from previous status information associated with the at least one element,
   wherein the change of status includes a change in physical characteristics of the at least one element;
   determining metadata associated with the at least one picture,
   wherein the determining of the current status information is further based on the metadata;
   wherein the metadata include contextual information associated with a capture of the at least one picture;
   and presenting at least one representation of the change of status of the at least one element in the at least one picture,
   wherein the at least one representation includes at least one visual effect to set apart only the change in the physical characteristics of the at least one element.

2. A method of claim 1, further comprising:
   determining the identity of the at least one element based on tagging information associated with the at least one picture.

3. A method of claim 1,
   wherein the change of status further relates to a change in geographical information, a change in personal relationship information, or a combination thereof of the at least one element, and
   wherein the at least one representation further includes at least another visual effect to set the at least one element apart from other elements depicted in the at least one picture when there is change in the geographical information, change in the personal relationship information, or the combination thereof of the at least one element.

4. A method of claim 1, further comprising:
   determining another picture that depicts the at least one element; and
   determining the current status information based on a comparison of the at least one picture to the another picture.

5. A method of claim 4, further comprising:
   determining a time range based on metadata associated with the at least one picture, metadata associated with the another picture, a user input, or a combination thereof,
   wherein the change of status of the at least one element is determined based on the time range.

6. A method of claim 4, further comprising:
   presenting a user interface including the at least one picture, the another picture, or a combination thereof;
   determining one or more user interactions with the at least one picture, the another picture, or a combination thereof,
   wherein the comparison is based on the one or more user interactions.

7. A method of claim 6, wherein the presenting of the at least one representation of the change of status of the at least one element is based on the one or more user interactions.

8. A method of claim 1, wherein the change of status further indicates that there is no longer a social networking relationship between the at least one element and another element depicted in the at least one picture, and wherein the at least one visual effect further includes a rendering of a break-line between the at least one element and another element to indicate that the social networking relationship no longer exists.

9. A method of claim 1, wherein the change of status further indicates that the at least one element no longer exists, and wherein the at least one visual effect further includes a rendering of a fading effect over the at least one element in the at least one picture to indicate that the at least one element no longer exists.

10. An apparatus comprising:
    at least one processor;
    and at least one memory including computer program code for one or more programs, the at least one memory and the computer program code configured to, with the at least one processor, cause the apparatus to perform at least the following, process at least one picture to determine an identity of at least one element present in the at least one picture;
    determine current status information associated with the at least one element based on the identity;
    determine that the current status information indicates a change of status of the at least one element from previous status information associated with the at least one element,
    wherein the change of status includes a change in physical characteristics of the at least one element;
    determine metadata associated with the at least one picture,
    wherein the determining of the current status information is further based on the metadata;
    wherein the metadata include contextual information associated with a capture of the at least one picture;
    and present at least one representation of the change of status of the at least one element in the at least one picture,
    wherein the at least one representation includes at least one visual effect to set apart only the change in the physical characteristics of the at least one element.

11. An apparatus of claim 10, wherein the apparatus is further caused to:
    determine the identity of the at least one element based on tagging information associated with the at least one picture.

12. An apparatus of claim 10,
    wherein the change of status further relates to a change in geographical information, a change in personal relationship information, or a combination thereof of the at least one element, and
    wherein the at least one representation further includes at least another visual effect to set the at least one element apart from other elements depicted in the at least one picture when there is change in the geographical information, change in the personal relationship information, or the combination thereof of the at least one element.

13. An apparatus of claim 10, wherein the apparatus is further caused to:
determine another picture that depicts the at least one element;
and determine the current status information based on a comparison of the at least one picture to the another picture.

14. An apparatus of claim 13, wherein the apparatus is further caused to:
determine a time range based on metadata associated with the at least one picture, metadata associated with the another picture, a user input, or a combination thereof,
wherein the change of status of the at least one element is determined based on the time range.

15. An apparatus of claim 13, wherein the apparatus is further caused to:
present a user interface including the at least one picture, the another picture, or a combination thereof;
determine one or more user interactions with the at least one picture, the another picture, or a combination thereof,
wherein the comparison is based on the one or more user interactions.

16. An apparatus of claim 15, wherein the presenting of the at least one representation of the change of status of the at least one element is based on the one or more user interactions.

17. An apparatus of claim 10, wherein the change of status further indicates that there is no longer a social networking relationship between the at least one element and another element depicted in the at least one picture, and wherein the at least one visual effect further includes a rendering of a break-line between the at least one element and another element to indicate that the social networking relationship no longer exists.

18. An apparatus of claim 10, wherein the change of status further indicates that the at least one element no longer exists, and wherein the at least one visual effect further includes a rendering of a fading effect over the at least one element in the at least one picture to indicate that the at least one element no longer exists.

* * * * *